(12) United States Patent
Feitsma et al.

(10) Patent No.: US 12,274,234 B2
(45) Date of Patent: Apr. 15, 2025

(54) ANIMAL SHED SYSTEM WITH AN AIR TRAP AND A SCRUBBER

(71) Applicant: LELY PATENT N.V., Maassluis (NL)

(72) Inventors: Peter Feitsma, Maassluis (NL); Fokke Stoel, Maassluis (NL); Karel Van Den Berg, Maassluis (NL); Frank Gerard Regelink, Maassluis (NL)

(73) Assignee: LELY PATENT N.V., Maassluis (NL)

( * ) Notice: Subject to any disclaimer, the term of this patent is extended or adjusted under 35 U.S.C. 154(b) by 186 days.

(21) Appl. No.: 18/011,364

(22) PCT Filed: Jun. 25, 2021

(86) PCT No.: PCT/EP2021/067458
§ 371 (c)(1),
(2) Date: Dec. 19, 2022

(87) PCT Pub. No.: WO2022/002776
PCT Pub. Date: Jan. 6, 2022

(65) Prior Publication Data
US 2023/0225286 A1 Jul. 20, 2023

(30) Foreign Application Priority Data
Jun. 30, 2020 (NL) ..................................... 2025953

(51) Int. Cl.
*A01K 1/01* (2006.01)
*A01K 1/00* (2006.01)
(Continued)

(52) U.S. Cl.
CPC .......... *A01K 1/0103* (2013.01); *A01K 1/0052* (2013.01); *B01D 53/14* (2013.01);
(Continued)

(58) Field of Classification Search
CPC .. A01K 1/0103; A01K 1/0052; A01K 1/0146; A01K 1/01; B01D 53/14; B01D 53/8634; B01D 2221/06; B01D 2258/0266
(Continued)

(56) References Cited

U.S. PATENT DOCUMENTS 4,008,689 A * 2/1977 Albers .................... C12M 27/06
119/450
4,208,279 A * 6/1980 Varani .................... C12M 21/04
210/613
(Continued)

FOREIGN PATENT DOCUMENTS

DE 1 607 259 6/1970
DE 199 04 010 A1 8/1999
(Continued)

OTHER PUBLICATIONS

International Search Report, issued in PCT/EP2021/067458, dated Oct. 4, 2021.
(Continued)

*Primary Examiner* — Tye William Abell
*Assistant Examiner* — Maria E Graber
(74) *Attorney, Agent, or Firm* — Birch, Stewart, Kolasch & Birch, LLP (57) ABSTRACT

An animal shed system includes an animal shed having an animal shed floor with a first and a second surface spaced apart, such that the floor has a thickness different from zero, and multiple flow holes extending from the first to the second surface; a reservoir situated under the animal shed floor, wherein the flow holes open up to the reservoir, and the flow holes allow a fluid flow from the animal shed to the reservoir; a floor opening in the animal shed floor to allow manure to be dumped in the reservoir; an air extraction device for extracting air underneath the floor, out of the
(Continued)

reservoir; and a device extending from the floor opening into the reservoir, wherein the device is configured to prevent an airflow from the animal shed to the reservoir through the floor opening when in use.

19 Claims, 7 Drawing Sheets

(51) Int. Cl.
  *B01D 53/14* (2006.01)
  *B01D 53/86* (2006.01)
(52) U.S. Cl.
  CPC ...... *B01D 53/8634* (2013.01); *B01D 2221/06* (2013.01); *B01D 2258/0266* (2013.01)
(58) Field of Classification Search
  USPC .......................................................... 119/450
  See application file for complete search history.

(56) References Cited

U.S. PATENT DOCUMENTS

| | | | | |
|---|---|---|---|---|
| 5,983,834 | A | 11/1999 | Tai | |
| 6,439,164 | B1* | 8/2002 | Notenbomer | C05F 17/979 |
| | | | | 119/447 |
| 6,746,179 | B1* | 6/2004 | Kerkhoff | A01K 1/0103 |
| | | | | 405/41 |
| 6,810,834 | B2* | 11/2004 | Hutchings | A01K 1/0151 |
| | | | | 52/180 |
| 7,232,036 | B2* | 6/2007 | Van Slyke | A01K 1/0103 |
| | | | | 210/160 |
| 8,543,276 | B2* | 9/2013 | Van Den Berg | A01K 5/0266 |
| | | | | 318/5 |
| 8,857,376 | B2* | 10/2014 | Klocke | F24F 7/065 |
| | | | | 119/500 |
| 9,861,070 | B2* | 1/2018 | Van Adrichem | A01K 1/01 |
| 2004/0149235 | A1* | 8/2004 | Pogue | A01K 1/0103 |
| | | | | 119/479 |
| 2007/0028851 | A1* | 2/2007 | McGregor | A01K 1/0151 |
| | | | | 119/509 |
| 2012/0006746 | A1* | 1/2012 | Rapp | B01D 53/58 |
| | | | | 210/164 |
| 2012/0055414 | A1* | 3/2012 | Correa | A01K 31/04 |
| | | | | 119/448 |
| 2013/0098306 | A1* | 4/2013 | Loosveld | A01K 1/0158 |
| | | | | 119/448 |
| 2015/0334980 | A1* | 11/2015 | Van Raam | A01K 1/0151 |
| | | | | 52/302.1 |
| 2020/0375142 | A1* | 12/2020 | Van Den Berg | B01D 3/346 |

FOREIGN PATENT DOCUMENTS

| | | | | |
|---|---|---|---|---|
| EP | 2 609 805 A2 | 7/2013 | | |
| NL | 2018338 B1 | 9/2018 | | |
| WO | WO-2007016758 A1 * | 2/2007 | ............... | A01K 1/01 |
| WO | WO-2010058383 A1 * | 5/2010 | ........... | A01K 1/0047 |
| WO | WO 2014/051421 A2 | 4/2014 | | |
| WO | WO 2019/156551 A1 | 8/2019 | | |

OTHER PUBLICATIONS

Written Opinion of the International Searching Authority, issued in PCT/EP2021/067458, dated Oct. 4, 2021.

* cited by examiner

ANIMAL SHED SYSTEM WITH AN AIR TRAP AND A SCRUBBER

BACKGROUND OF THE INVENTION

Field of the Invention

The invention relates to an animal shed system with a device extending from the floor opening into the reservoir, wherein the device is configured to prevent an airflow from the animal shed to a reservoir through a manure dump opening when in use.

Description of the Related Art

The input of nitrogen containing compounds, in particular nitrogen oxides and ammonia, into the environment are mostly because of the industry, traffic and agriculture. This human factor has severely altered the global nitrogen cycle since the beginning of the Industrialization. The nitrogen compounds spread in the environment and in too high concentrations contribute to the domination of fast-growing plant species, with associated declines in species richness. Fast growing species have a greater affinity for nitrogen uptake, and will crowd out slower growing plant species by blocking access to sunlight with their higher above ground biomass. Other studies have found that secondary responses of the system to nitrogen enrichment, including soil acidification have allowed stress-tolerant species to out-compete sensitive species.

The input of ammonia is mostly attributed to agriculture, especially animal husbandry, including dairy farming. Alone in the Netherlands, a relatively small country, there are four million cows, twelve million pigs and 98 million chicken in the animal husbandry sector. Farmers use the manure of these animals to fertilize their crops. Part of the manure (in the meaning of dung, being the excrements of animals—feces and urine together) is emitted as ammonia into the air. Although an ingredient for fertilizers, ammonia is a toxic and flammable gas.

The total amount of human nitrogen input should be reduced in order to stabilize the nitrogen cycle. The amount of nitrogen oxide input is already reduced, but the input of ammonia remains at an undesirable high level. Most of the ammonia input comes from cattle, as ammonia is formed from urea, which is a relatively unstable compound. When urine and feces of cattle (but also other livestock) come in contact, the urease enzyme of the feces will accelerate that transformation into ammonia and carbon dioxide.

International patent publication WO2014051421 discloses a self-navigating vehicle for removing manure from a stall floor. The floor is permeable to urine. Urine passing through the floor is drained, and all fertilizers originally present in the urine remain present in the effluent and are not separated into individual streams.

Dutch patent publication NL2018338 describes a shed system having a floor with flow holes through which the urine flows, and a manure removal means to remove the solid feces from the floor. The ammonia from the urine is then processed in an air washer into fertilizer. The urine and feces are collected and stored in separate spaces, which has the disadvantage that another storage space next to the feces storage space is needed.

It is known that a perforated shed floor will let urine through to an underlying space. The shed floor is covered with fibrous material, e.g. from the feces, and/or other fiber material suitable for animal sheds. Air with ammonia above the urine is filtered off and passed through an air washer. The aim is to evaporate and remove all ammonia from the urine in this way. Feces stays on top of the floor. A perforated floor has the disadvantage that the holes will be blocked by dirt and the like quite easy.

It would therefore be desirable to provide an animal shed system that alleviates at least some of the perceived inconveniences of the prior art.

BRIEF SUMMARY OF THE INVENTION

According to the invention, there is provided an animal shed system comprising
an animal shed having an animal shed floor with a first and a second surface spaced apart, such that the floor has a thickness different from zero, and multiple flow holes extending from the first to the second surface;
a reservoir situated under the animal shed floor, wherein the flow holes open up to the reservoir, and the flow holes allow a fluid flow from the animal shed to the reservoir;
a floor opening in the animal shed floor to allow manure to be dumped in the reservoir;
an air extraction device for extracting air underneath the floor, out of the reservoir; and
a device extending from the floor opening into the reservoir, wherein the device is configured to prevent an airflow from the animal shed to the reservoir through the floor opening when in use.

Traditionally, cattle is kept in an animal space on a slatted floor with slotted openings that open out to an underlying reservoir, i.e. a manure storage space or manure cellar. Feces and urine fall through the slotted openings and end up in the manure cellar that serves as storage for the mixture of urine and feces, the so-called dung or manure. In the manure, all fertilizer components such as phosphates, fibers and nitrogen are present. The reaction of urine with feces produces ammonia that exits through the slotted openings into the shed and eventually to the environment where it has a harmful effect.

Due to regulations and environmental protection, it is desirable to fertilize with individual fertilizer components. To separate manure into individual manure components is tricky and expensive.

It is known that a perforated shed floor, i.e. an animal shed floor with multiple flow holes, will let urine through to an underlying space, which can be (a portion of) the reservoir. Air with ammonia above the urine is filtered off and passed through an air washer, also called a gas washer or a scrubber. The aim is to evaporate and remove all or at least part of the ammonia in this way. The feces stay on top of the floor, i.e. the first surface or living or walking surface, and can be removed by a manure removal vehicle, such as a manure suction robot, or manure slide. Preferably, the system may further comprise a wheeled manure-removal vehicle for removing manure from the animal-shed floor, i.e. from the first surface, and dumping the manure into the reservoir through the floor opening. The floor opening for dumping manure or feces in the reservoir may be located at a distance from the shed floor having through holes, for instance at a location where the animal shed floor comprises a closed floor, i.e. without through holes opening towards the reservoir, except for the floor opening for dumping feces or manure.

The air extraction device reduces the air pressure, such that air, with the ammonia present, is sucked out of the animal space or shed above the floor. This results in an additional reduction of emissions to the environment. Additionally, an airflow between the animal shed and the reservoir is established via the flow holes. This additional airflow above the shed floor increases the flow of urine through the holes.

In particular, the animal shed system may comprise an air washer coupled to the air extraction device to capture ammonia present in the extracted air. The air washer or scrubber may contain an acid solution, such as sulfuric acid or nitric acid. The air above the liquid layer, which will generally mainly consist of urine, has a high ammonia content. By forcing the air from the reservoir through an air washer, known per se, the ammonia is bound in the scrubber's acid solution. The ammonia may react with sulfuric acid to form a liquid fertilizer. This fertilizer can be used to fertilize the fields, wherein the nitrogen compound will be rapidly absorbed by the soil (quicker than when using manure).

It has been found experimentally that a particularly advantageous effect is obtained if the air extraction device creates a lower pressure under the floor relative to the pressure above the floor. Preferably, the pressure difference is between 0.3 mbar and 1.0 mbar. The air extraction device thus creates a low vacuum under the floor, with a lower pressure than atmospheric pressure. The pressure under the floor is preferably 0.3 to 1.0 mbar lower than atmospheric pressure that is active above the floor. The reservoir can be split in a feces storage space and a urine storage space, separated either with a wall to avoid (further) contact, or by distance to reduce contact. Separation by distance can be achieved with locating the floor opening at a relatively remote location in the animal shed relative to the shed floor having through holes, for instance at a location where the animal shed comprises a closed shed floor, i.e. without through holes or slotted openings. Traditionally, feces and urine excreted by an animal, in particular a cow, are dumped and stored in a mixed fashion, i.e. as manure or dung. The system disclosed herein can be used as well for manure, i.e. the mixture of feces and urine, or even for liquid manure or slurry, i.e. the mixture of manure with another liquid such as water. In these situations, ammonia will be formed from the urine in the mixture.

The ammonia is sucked towards the air washer from the reservoir, possibly specifically from the urine storage space, wherein the air washer is located at an external location from the animal shed. The air washer can be in connection with the manure or urine storage space via a slurry pit or liquid manure pit, or a conduit, or a combination thereof, wherein the air washer is located at a distance from the slurry pit and/or the animal shed.

In use, the device is configured to prevent an airflow from the animal shed to the reservoir through the floor opening. This is to be able to establish the lower than atmospheric pressure in the reservoir. In use, stationary manure in the device will close a passage from the animal shed to the reservoir and thus prevent an airflow from the animal shed to the reservoir. However, an alternative airflow is established via the flow holes in the shed floor, with the advantage that urine and/or ammonia formed on the shed floor are sucked into the reservoir.

The device may further comprise a grating or grid provided over at least part of a cross sectional area of the device. The grating may be provided such that strange objects, like a cattle collar or a stone, that end up in the collected or dumped manure will not enter the device and/or the reservoir, but will be retained at the grating and can be removed without much ado. Furthermore, the grating may act as a safety element, such that a person, like a child, and/or a small and/or young animal (a calf, a dog or a cat) are hindered to accidentally fall in the device and/or reservoir. In order to further enhance the safety near the floor opening, the system may further comprise a safety cage that at least envelopes the area of the floor opening, and is attached to the animal shed floor. It is preferred that when a wheeled manure-removal vehicle is used to remove manure from the floor, that the safety cage will allow access to the floor opening.

The device may comprise a tube extending from the floor at the floor opening, and towards a bottom of the reservoir, forming a passageway from the animal shed floor to the reservoir, wherein the tube has a free end ending at a distance different from zero from a bottom of the reservoir, wherein the free end opens out into the reservoir (i.e. the free end is at least partially open), wherein in use an airflow from the animal shed to the reservoir is prevented when a manure or feces level in the reservoir extends up to or into the tube through the free end.

The tube may have a cylindrical, rectangular, or any other shaped cross section. Since the tube is configured to prevent an airflow from the animal shed to the reservoir through the floor opening when in use, the cross section of the tube is preferably commensurate with the peripheral shape of the floor opening, i.e. the cross-sectional shape and dimensions of the tube coincide with a shape and dimensions of the floor opening. Alternatively, the cross section of the tube may have an area larger than that of the floor opening, thereby covering the area of the floor opening fully, and may even extend beyond the area of the floor opening. In this latter case, the shape of the cross section of the tube can deviate from that of the peripheral shape of the floor opening, e.g. combining a rectangular floor opening with a cylindrical tube having a circular cross section that is larger than the floor opening in all dimensions, or vice versa.

The tube may be made of plastic, metal (e.g. stainless steel) or any other suitable material that can withstand the harsh environment of a manure pit. The tube may be a rigid or a flexible tube. In case of a flexible tube, a foil material may be used. A flexible tube is preferably provided with a tensioning means, such as a load or weighting or tension threads that connect the free end of the tube with the base of the reservoir or with the shed floor at one or multiple locations along the periphery of the tube at the free end. Such tensioning means can be used to stretch the tube over its full length, and/or to overcome at least any upward force or lift from the manure, and have the flexible tube extend into the manure when in use. The tensioning means may be provided at the free end of the tube, or may stretch over at least part of an exterior of the tube.

When the manure in the reservoir reaches at least the same height as the free end of the tube, the air cannot flow from the reservoir to the animal shed. When the manure level is even higher, the free end will be overlapped with manure, thus blocking the airflow as well.

In an embodiment, the device comprises a tube extending from the floor at the floor opening, and towards a bottom of the reservoir, wherein the tube has a free end ending at a distance different from zero from a bottom of the reservoir, the tube having a base that closes off its free end, and forms a container with the peripheral sidewall that encloses an interior of the device, wherein the sidewall comprises an outlet opening towards the reservoir, the outlet opening being located at a distance from zero from the base; and the device further comprises a cover extending into the tube and covering the outlet opening and part of the base, wherein an end edge of the cover is at least at a same height as a lower edge of the outlet opening, which lower edge is at a distance different from zero from the base, thereby creating a passage from the floor opening to the outlet opening, wherein in use the airflow from the animal shed to the reservoir is prevented when a manure or feces level in the tube is at least at at a similar height as the end edge of the cover or higher, thereby blocking the passageway.

In this embodiment, the tube extends into the reservoir and is closed at the end. The closed end of the tube may be regarded as a base. Adding the base to the tube transforms the tube into a container, like a box or a bag, having a base and an upstanding sidewall. The outlet opening in the sidewall now forms the passage to the reservoir or manure pit. The outward opening ensures a passage for the manure from the floor opening to the reservoir. The tube may end above a manure level in the reservoir, or in the manure, such that the base and part of the tube are in contact with the manure in the reservoir. In this embodiment, the tube has at least one outlet opening. In the case of multiple outlet openings, it is preferred that they are located at separate locations at a similar height along the sidewall. Preferably, the lower edges of the multiple outlet openings are at the same height.

In another embodiment, the device comprises a tube extending from the floor at the floor opening, and towards a bottom of the reservoir, wherein the tube has a free end ending at a distance different from zero from a bottom of the reservoir, the tube having a base that closes off its free end, and forms a container with the peripheral sidewall that encloses an interior of the device, wherein the sidewall comprises an outlet opening towards the reservoir, wherein the outlet opening extends from the base towards the floor opening; and the device further comprises a cover extending into the tube and covering the outlet opening and part of the base, thereby creating a passage from the floor opening to the outlet opening, wherein the cover further comprises a flap that is hingeably attached to a second edge of the cover, wherein the flap rests against the first edge of the base to close the passage such that the airflow from the animal shed to the reservoir is prevented, and wherein flap is hingeably pushed open by a manure or feces level in the container that is sufficient to overcome gravitational forces exerted on the flap, such that the passage is opened.

In an embodiment, the cover extends from the floor at the floor opening or from the sidewall of the tube at a location near the floor opening. 'Near the floor opening' would mean a location at the sidewall situated at least above the outlet opening.

The cover may be formed as a funnel that narrows towards the base of the tube. The cover and tube may be formed integrally, or can be formed as separate parts that are assembled later to form the device. Preferably, the cover is removably assembled with the tube, such that the cover can be removed for maintenance and/or replacement. The cover may be attached to the tube or to the floor, for instance at an edge of the floor opening.

A funnel shaped cover may be particularly advantageous when the tube has more than one outlet opening. Preferably, the sidewall has at least two outlet openings at separate locations of the sidewall at the same height, and the cover is funnel shaped, and extends into the tube covering all outlet openings in the sidewall.

Furthermore, the cover may extend at a first end from the floor opening into the container. A second end of the cover, opposite of the first end, is at least level with the lower edge of the outlet opening, i.e. the cover extends over the full outlet opening. The cover extends over the outlet opening at a distance different from zero from the sidewalls and the bottom of the container, i.e. space is kept between the container and the cover, such that a passage is created between the container and the insert from the floor opening to the reservoir via the outlet opening. Preferably, the passage is releasing towards the reservoir for any larger object that enters the device, either purposely or accidentally. The releasing passage may start with a smallest opening between the sidewall and the cover, and extends via openings with increasing area to a largest opening, which is the outlet opening towards the reservoir. As such, any object that passes the smallest opening will thus also be able to pass any further openings along the passage to finally end up in the reservoir.

The cover is used to create an airlock or air trap in this passage. In use, the manure will stop pouring into the reservoir when the level of manure has reached the lower edge of the outlet opening. The outlet opening is covered by the cover that extends into the container to at least the lower edge of the outlet opening. In other words, the end edge of the cover is at least at the same height as the lower edge of the outlet opening. Preferably, the end edge of the cover extends beyond the lower edge of the outlet opening. When the cover extends beyond the lower edge of the outlet opening, in use, a larger part of the cover may come into contact with the manure. The cover may have a first side facing the floor opening, and an opposite second side facing the outlet opening. The cover may be in contact with the manure at at least a part of the first side, or at least a part of the first and the opposite second side.

The cover may stretch from the floor opening into the container, for instance at an inclination between 0 and 90 degrees with respect from the floor, for instance at an angle between 30 to 60 degrees, i.e. in a slanted downward fashion toward the base of the container. Alternatively, or in addition, the cover may comprise two portions, of which a first portion may stretch at a first angle with respect to the floor and a second portion may stretch at a second angle with respect to the first portion. The angles may be different or similar, wherein the first and second angles are different, i.e. not the same. Preferably, the cover covers the base fully along one of a longitudinal direction and a width direction, and partly along another of the longitudinal direction and the width direction. Whereas the cover covers at least the outlet opening of the container, the cover may extend over the full length or the full width of the floor opening, and over part of the other of the width or the length of the floor opening. The full extent of the cover may depend on the location and/or the dimensions of the outlet opening, either on a longitudinal side (length) or on a transverse side (width). Preferably, the outlet opening extends over the full width or length of the container, and from the floor towards the base. The outlet opening is limited by the lower edge of the outlet opening that is at a distance different from zero from the base. The outlet opening may extend from the floor towards the base.

Preferably, the sidewall converges towards the base to form a trough-shaped lower part of the container. The sidewall may converge at the longitudinal and/or transverse sides to form the trough-shaped lower part. As such, the base may cover a smaller area than the cross-sectional area at the non-converged sidewalls. A trough-shaped lower part of the container may enhance the flow of the manure to the outlet opening when dumped in the container through the floor opening. Preferably, the lower edge of the outlet opening coincides with an upper edge of the trough-shaped lower part of the container.

DESCRIPTION OF ILLUSTRATIVE EMBODIMENTS

Figure 1A:
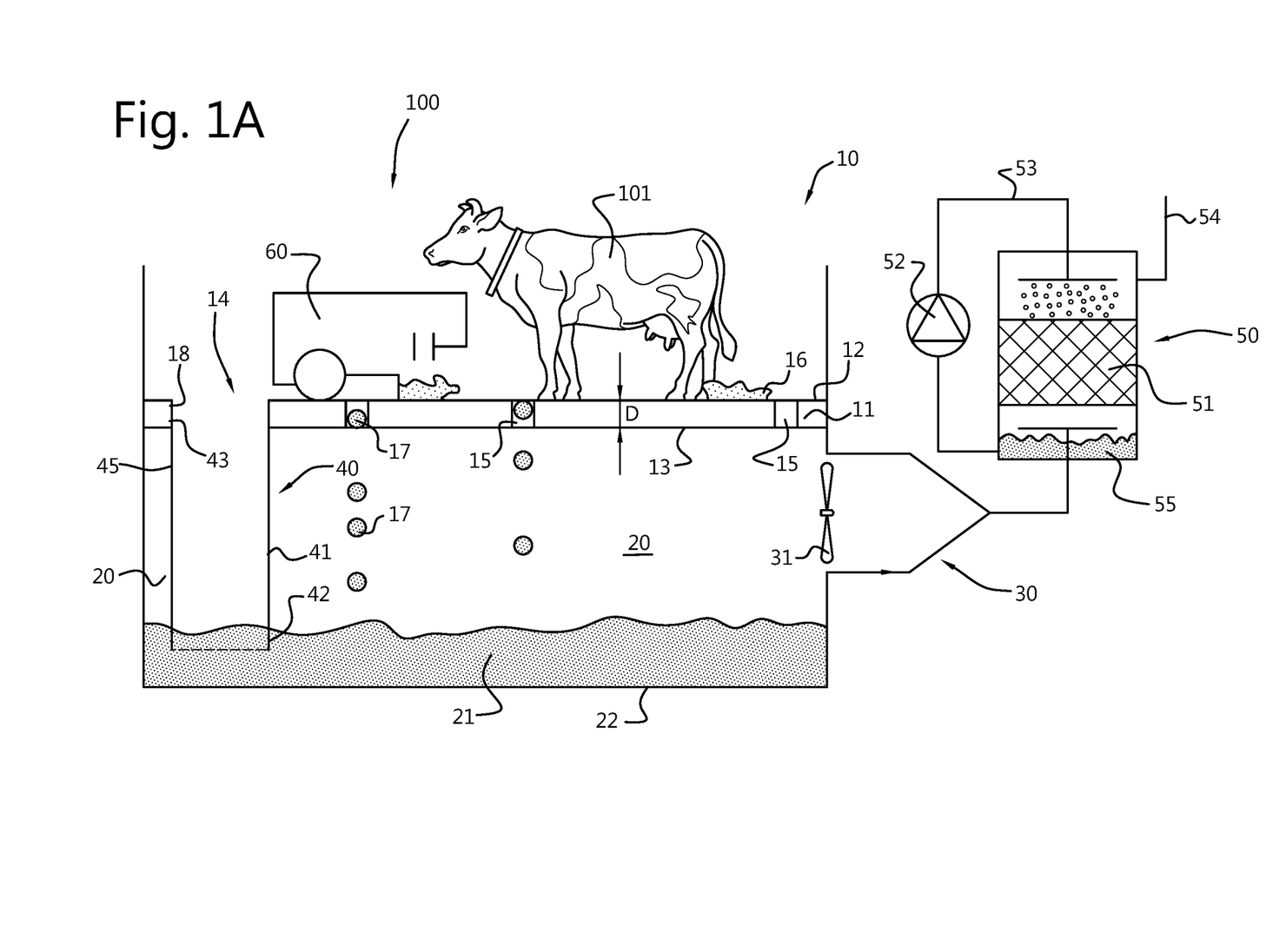
FIGS. 1A and 1B each show a schematic view of an animal shed system with an embodiment of the device.
Figure 1B:
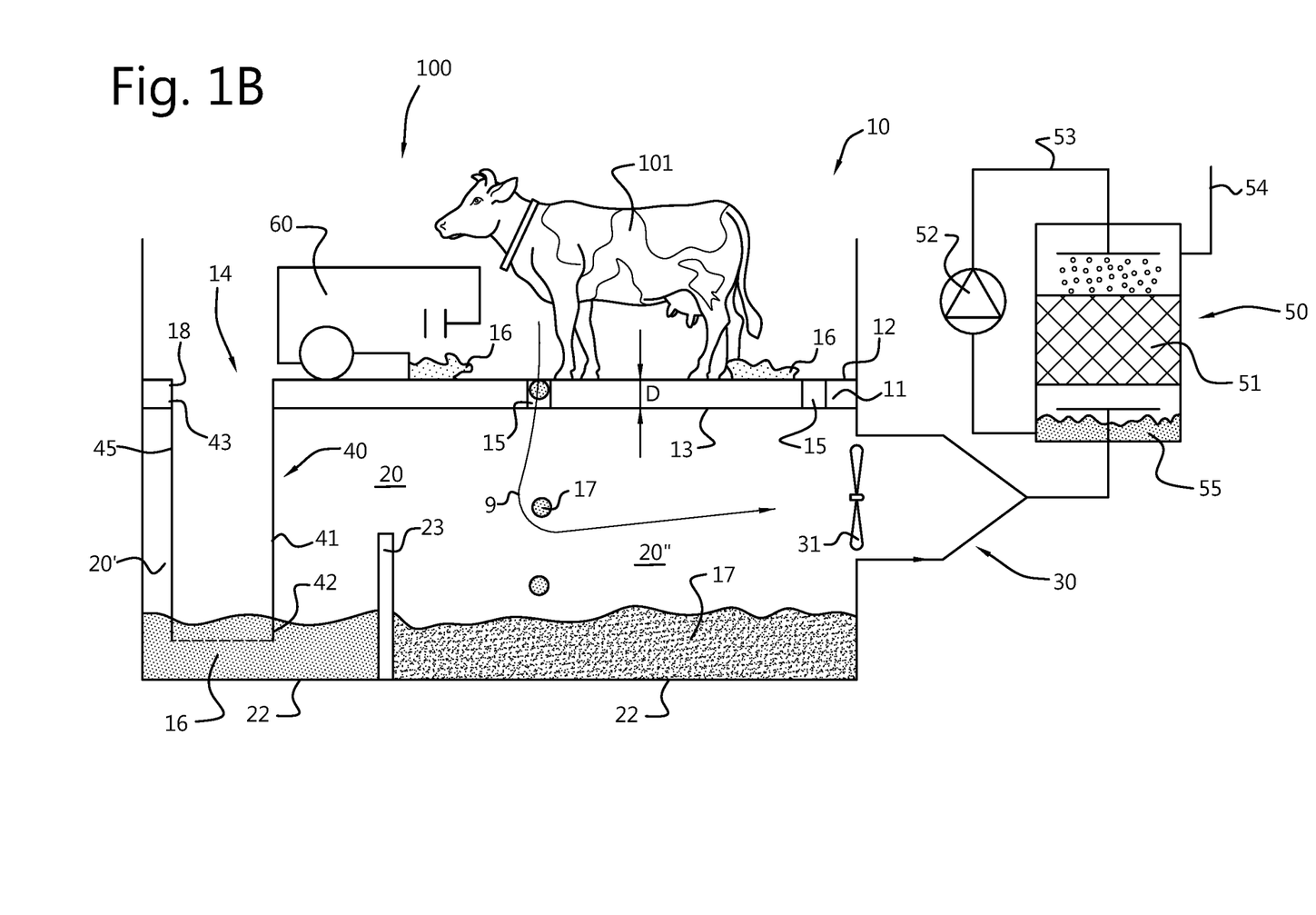

FIGS. 1A and B (together as FIG. 1) show a schematic drawing of an embodiment of an animal shed system 100 according to the invention. The animal shed system 100 comprises an animal shed 10. The animal shed 10 is used for animal husbandry, in particular for cattle, shown as a cow 101 in FIG. 1. The animal shed 10 has an animal shed floor 11 having a first and a second surface 12, 13 spaced apart, i.e. the floor 11 has a thickness D that is different from zero, i.e. not zero. The first surface 12 is a living or walking surface of the floor 11 for the animals and other users. The floor 11 has multiple flow holes 15 extending from the first to the second surface 12, 13, i.e. they are through holes. The system further comprises a reservoir 20, i.e. a manure storage space or manure cellar, situated under the animal shed floor 11. A floor opening 14 in the animal shed floor 11 allows manure 21 to be dumped in the manure-storage space 20. The system further comprises an air extraction device 30 for extracting air underneath the floor, out of the reservoir, and a device 40 extending into the reservoir 20.

The device 40 comprises a tube 41 that extends from the floor 11, in the floor opening 14, and into the manure 21 in the reservoir 20. The tube comprises a peripheral sidewall 45 that encloses an interior of the device. The tube ends in the manure with a free end 42 at a distance different from zero from a bottom or base 22 of the reservoir 20. The free end 42 opens out to the reservoir 20. As shown in FIG. 1, the free end 42 sticks into the manure 21 (i.e. the level of the manure 21 is higher than the distance or spacing between the free end 42 and the base 22), and thus closes the flow path of air from the animal shed 10 to the reservoir 20. The device 40 thus prevents an airflow from the animal shed 10 to the reservoir 20 through the floor opening 14 when in use.

In use, at least the feces 16 are dumped through the floor opening 14 into the manure cellar 20 via the device 40. When the level of the manure or feces 16 has reached either a level of the free end 42 of the tube 41 or a height beyond the free end 42 of the tube 41, the airflow passage through the floor opening 14 to the reservoir 20 is blocked with manure.

Figure 2A:
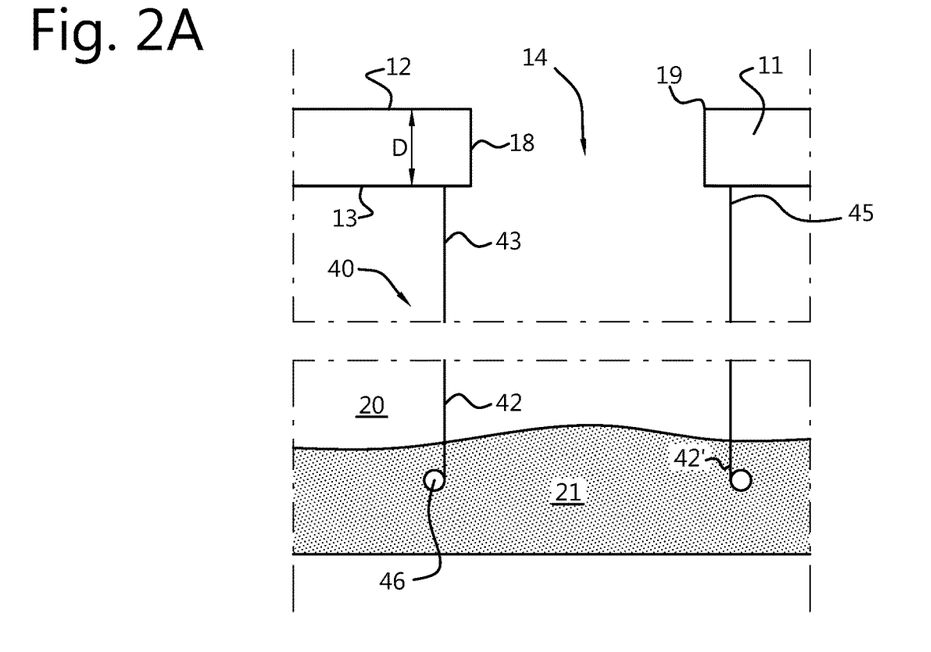
FIGS. 2A to C show a schematic view of another embodiment of the device.
Figure 2B:
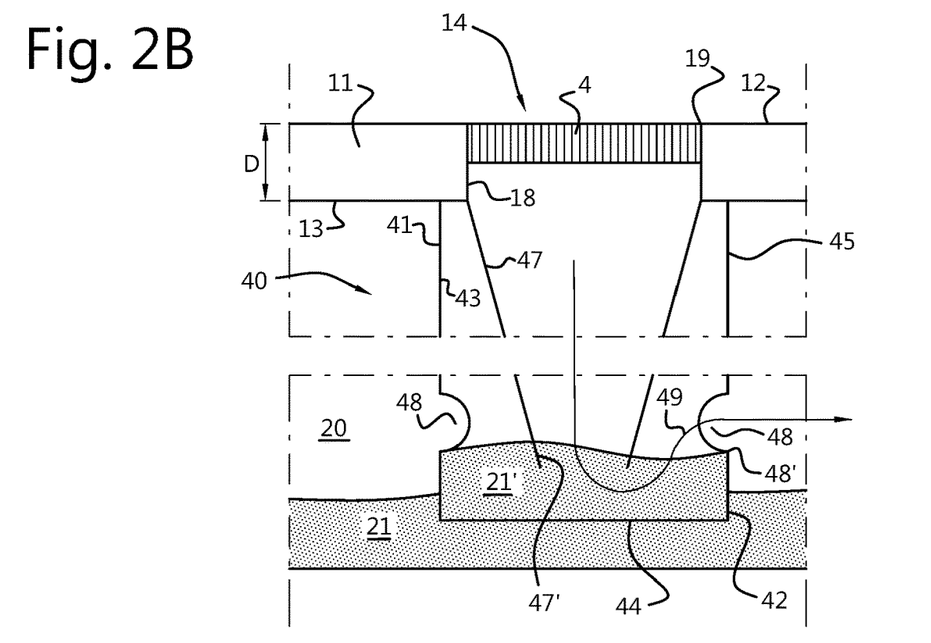
Figure 2C:
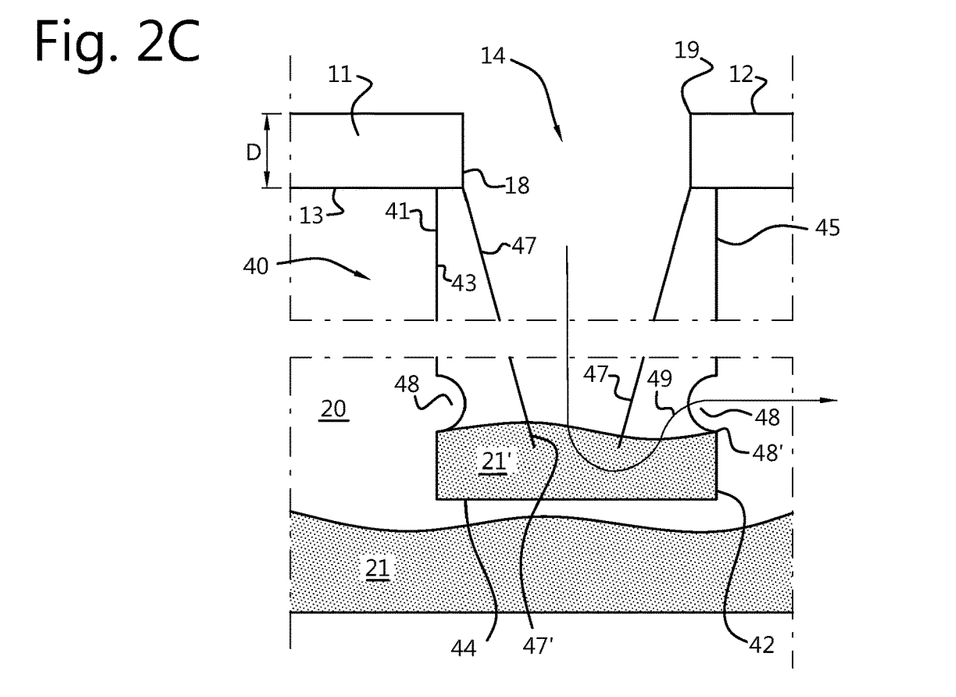

The free end 42 of the tube 41 may be tensioned with a weight or any other suitable tensioning means 46, in particular when the tube 41 is a flexible tube or made of a flexible material, see FIG. 2. Tensioning the tube 41 may assist with retaining the tube and the free end 42 with respect to the floor opening and preventing floating of the tube 41 under the influence of any upward force or lift from the feces or manure.

The air extraction device 30 can be a fan, in particular a blower 31, for extracting air under the assembly. The system 100 further comprises an air washer 50 coupled to the air extraction device 30 to capture ammonia present in the extracted air.

The blower 31 provides a low vacuum of approximately 0.7 mbar below atmospheric pressure, which is the difference between the prevailing air pressure in the animal shed 10 and the lower pressure in the manure cellar 20 located under the shed floor 11. Because the holes 15 are relatively small and the free space under the shed floor 1 is relatively large, the prevailing pressure in this free space will be relatively constant seen over the entire space. In other words, the pressure gradient in the direction of the blower 31 is small.

The device 40 is used to only allow an airflow 9 through the holes 15 in the floor by preventing an airflow through the relatively large floor opening 14. Thus, the blower 31 can work more energy efficient, i.e. does not need a very high power rate to establish and maintain the low vacuum in the reservoir 20.

The air washer 50 shown in FIG. 1 is designed as a packed bed-washing column. Acid absorbent liquid in the form of diluted sulfuric acid or diluted nitric acid is pumped by a pump 52 from underneath a packed bed 51 to a sprayer 53 above the packed bed 51. The ammonia-rich air extracted by the blower 31 is introduced in countercurrent under the packed bed 51 and flows upwards in countercurrent with the absorbent liquid. The absorbent liquid absorbs, among other things, the ammonia and makes it soluble as ammonium. In purified form, the air is conducted via an outlet 54 to the outside environment. The packed bed 51 can be made from different types of fillers and serves to increase the contact surface of the absorbent fluid with the air to be purified. The air washer 50 can also be carried out in transverse flow, wherein the airflow is being lead through the packed bed 51 in a horizontal direction. The packed bed 51 can also be in the form of a cloth over which the absorption liquid runs and the air to be washed is passed through in transverse flow.

After some time, the amount of dissolved ammonia in the absorbent causes a pH increase, such that the absorbent has to be replaced. The resulting saturated and still slightly acidic absorption liquid 55 is a nitrogen-containing fertilizer as so-called flushing water. In order to be able to postpone replacement, in an embodiment not shown, the air washer comprises an acid dosing system to be able to keep the pH of the absorption liquid constant.

In addition to ammonia, water vapor from the manure cellar 20 will also pass through the air washer 50 and be removed. This will lead to a thickening of the liquid in the manure cellar 20. This liquid is rich in salts; in particular, potassium salts, and is therefore a good potassium fertilizer.

The cow 101 excretes feces 16 and urine 17 that will land on the living surface 12 of the floor 11. Due to the flow holes 15 in the floor 11, urine flows into the reservoir or manure cellar 20. The reservoir 20 can be a single storage space where both urine and feces are stored, although having a separate route to the reservoir 20, as shown in FIG. 1A. Due to these separate routes, the feces 16 may be concentrated at a certain part of the manure cellar 20, but will still be in contact with the urine 17 in the remaining part of the reservoir 20.

FIG. 1B shows a reservoir where the feces 16 and the urine 17 are also (mostly) separately stored in either partitioned or enclosed areas, defined by a wall or the like. The urine 17 is stored in a urine storage space 20" and the feces 16 are stored in a feces storage space 20', which are separated by a separation wall 23. The wall 23 extends from the base 22 towards the floor 11 of the animal shed. The wall 23 ends at a distance different from zero from the floor 11, leaving a gap between the floor 11 and the wall 23, as shown in FIG. 1B.

In use, manure 21 or feces 16 will be dumped through the floor opening 14 into the manure cellar 20. With the device 40 provided in the floor opening 14, the feces 16 or the manure 21 is dumped in the cellar via the device 40.

An autonomous manure suction robot 60 runs between the animals over the floor 11. This robot 60 removes solid feces 16 that largely remain on the surface of the floor 11, and then dumps the feces 16 in the manure storage space 20, or in case of FIG. 1B, in the feces storage space 20', through the device 40. In an embodiment not shown, the feces 16 are removed by a pulled manure slide. Additionally, or alternatively, the collected feces 16 can be further processed by, for example, drying or pressing whereby manure fibers are removed from the feces 16.

Contact between feces 16 and urine 17 provides an enzymatic conversion reaction of urea in the urine 17 to ammonia. When ammonia forms on the floor 11, it can easily escape to the environment, even in case of a flow to the reservoir induced by the blower 31. By using a suction robot 60 for this purpose, the feces 16 are removed from the floor 11 on site and the feces 16 are not spread over the floor 11. This has the advantages of preventing the spread feces from blocking the holes 15, and the spread feces and freshly excreted urine having a relatively short period of contact, thereby reducing the amount of ammonia formed on the first floor surface 12.

In the embodiment of FIG. 1B, the feces 16 are not mixed with the urine 17 and almost all phosphate remains in the feces, and the solids percentage is relatively high. Eventually, the excretion products (feces 16 and urine 17) of the farm animal 101 in the animal space 10 can be separated into three parts in a relatively simple manner: phosphate-rich solid feces 16 with a high organic content, a potassium-rich liquid and a nitrogen-rich liquid. These parts can be used for specific fertilization processes and have a value that is higher than that of the manure that generally results when feces 16 and urine 17 are dumped in the manure cellar together.

The tube 41 forming the device 40 in FIGS. 1A and 1B has dimensions that coincide with those of the floor opening 14. In addition, a first periphery 18 of the floor opening coincides with a second periphery 43 of the tube 41.

FIGS. 2A to C (together FIG. 2) show embodiments of the device 40 comprising the tube 41, now having a width dimension that is larger than that of the floor opening 14, such that the first and second peripheries 18, 43 do not coincide, either in shape, dimensions and/or size. The tube 41 extends beyond the first periphery 18 of the floor opening 14. FIG. 2A shows a device 40 comprising a tube 41 having a weighting 46 at its free and open end 42 to prevent lifting of the tube end by the manure 21 in the reservoir 20. In order to successfully prevent an airflow from the animal shed 10 to the reservoir 20, the free end 42 of the tube 41 extends into the manure, i.e. an end edge 42' of the tube 41 is inserted in the manure 21 in the reservoir 20.

FIG. 2B shows the device 40 comprising a tube 41 that has a free end 42 that is closed with base 44. The sidewall 45 of the tube 41 is provided with two outlet openings 48 that open out to the reservoir 20. The cover 47 extends into the tube 41, and is funnel shaped. The end edges 47' of the cover 47 are level with a lower edge 48' of the outlet opening 48. Alternatively, the end edges 47' of the cover 47 extend beyond the lower edge 48' of the outlet opening 48, i.e. the end edges 47' are closer to the base 44 of the tube 41 than the lower edge 48', see FIG. 2C. In use, manure 21' will enter the tube 41. First, the tube 41 will fill up from the base 44, until the manure level is higher than the lower edge 48' of the outlet opening 48. As more manure 21' will enter the tube 41, the manure 21' will flow into the reservoir 20, until the manure level is at the same height as the lower edge 48' of the outlet opening 48. The remaining manure 21' will block the passageway 49 from the floor opening 14 to the reservoir 20 that is created in the device FIG. 2B further shows a grating or grid 4 in the floor opening 14, extending over the full area of the floor opening 14. The grating 4 is provided such that strange objects, like a cattle collar or a stone, that end up in the collected or dumped manure will not enter the device 40 and/or the reservoir 20, but will be retained at the grating and can be removed without much ado. Furthermore, the grating 4 acts as a safety element, such that a person, like a child, and/or a small and/or young animal (a calf, a dog or a cat) are hindered to accidentally fall in the device 40 and/or reservoir 20.

The tube 41 can either extend into the manure 21 in the reservoir 20, as shown in FIG. 2B, such that the remaining manure 21' in the tube 41 acts as a weighting against floating of the device 40 (in case of a flexible tube or device). FIG. 2C shows that the tube 41 can also end above the manure 21 in the reservoir 20. The remaining manure 21' can then be used as a tensioning means, in particular when a flexible tube or device is used.

Figure 3A:
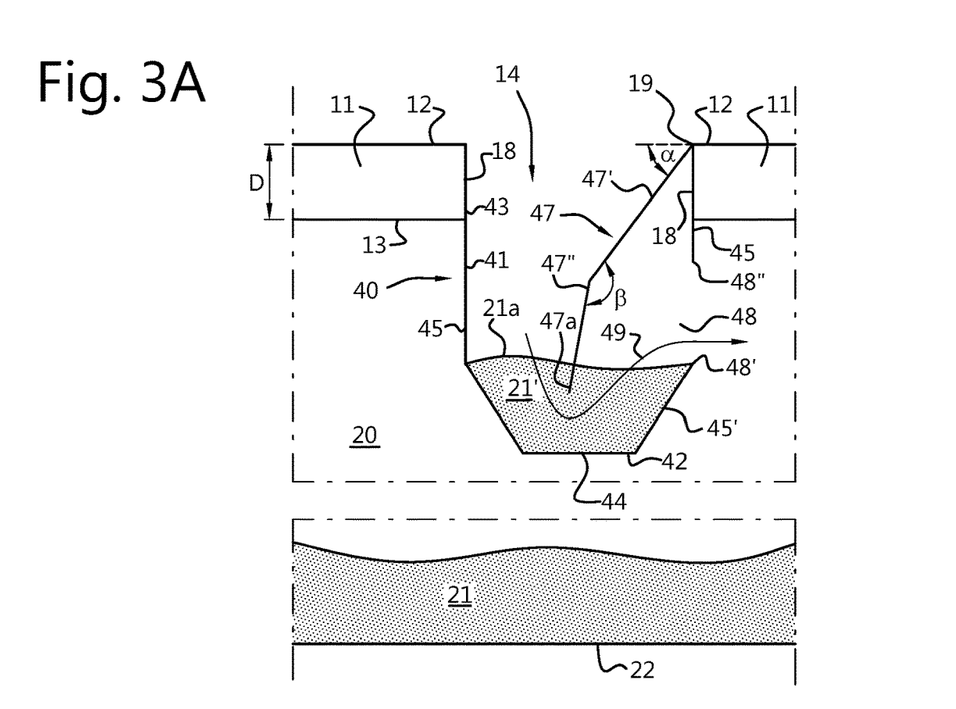
FIGS. 3A and B show a schematic view of a third embodiment of the device.
Figure 3B:
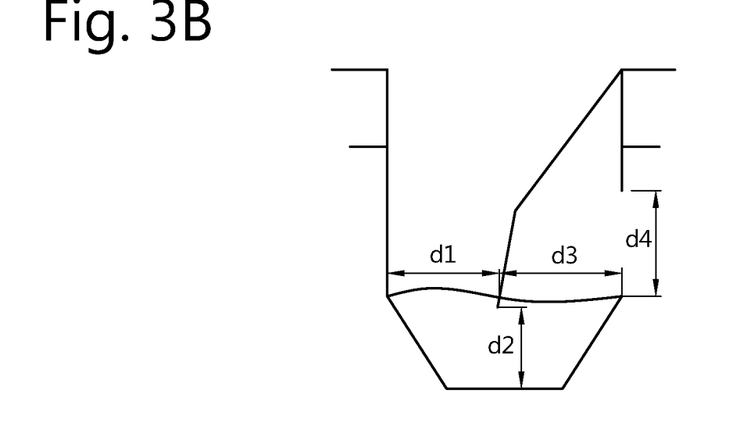
Figure 4:
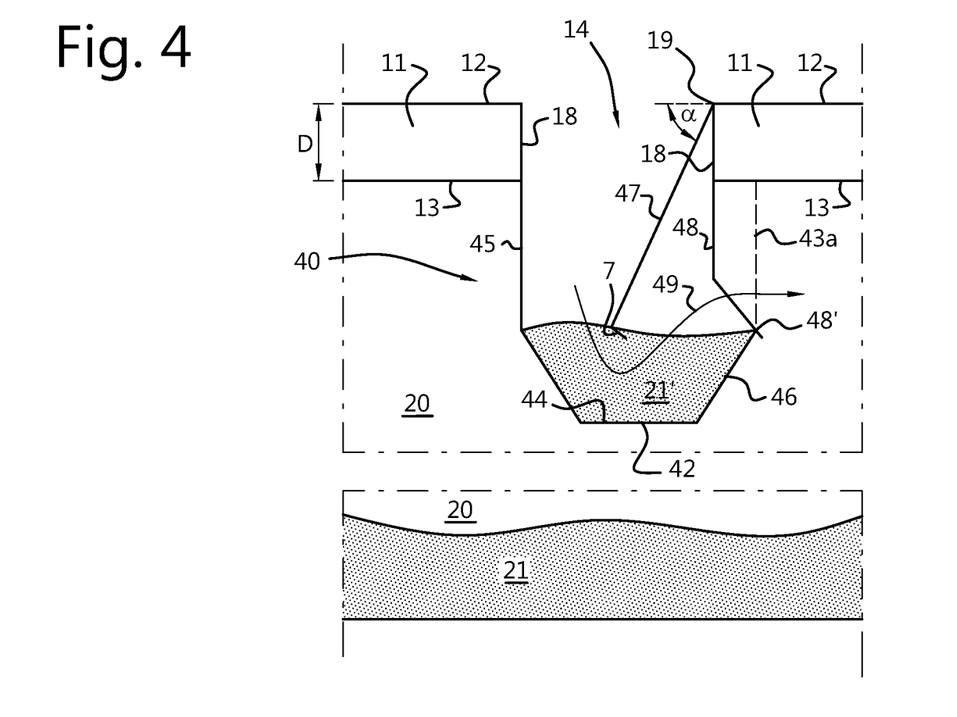
FIG. 4 shows a schematic view of a fourth embodiment of the device.

FIGS. 3 and 4 show a device 40 that comprises the tube 41 again having the peripheral sidewall 45 that encloses an interior of the device, and the base 44 that closes off its free end 42, in this case forming a container. In this embodiment, the free end 42 does not open out into the manure cellar 20 as in FIGS. 1 and 2A. The sidewall 45 extends from the base 44 towards the floor 11. The device 40 is connected to the floor 11 at the opening 14. The sidewall 45 is provided with an outlet opening 48 that opens towards the reservoir 20. The outlet opening 48 extends from an upper edge 48" that is at a distance different from zero from the floor 11, i.e. from the second surface 13, to a lower edge 48' that is at a distance different from zero from the base 44 of the tube 41.

A lower part 45' of the sidewall 45 converges towards the base 44. The converging of the lower part 45' can be partially or fully along a third periphery of the lower part 45'. The device 40 further comprises a cover 47 that extends from an edge 19 of the floor opening 14 towards the base 44 of the tube 41. The cover 47 extends over the outlet opening 48 in the sidewall 45. The cover 47 also extends over part of the base 44, creating the passage or passageway 49, shown as an arrow in FIGS. 2B, 2C, 3 and 4, between the sidewall 45, the base 44 and the cover 47. The remaining manure 21' in the tube 41 closes the passageway 49 when a manure level 21a is at a similar or higher height as an end edge 47a of the cover 47, as shown in FIGS. 3 and 4.

In FIG. 3, the cover 47 comprises a first portion 47' that extends from the edge 19 of the floor opening 14 into the tube 41, and a second portion 47" that extends from the first portion 47' into the tube 41. The first portion 47' is at an angle $\alpha$ (alpha) with the floor 11, and the second portion 47" is at an angle $\beta$ (beta) with respect to the first portion 47'.

FIG. 3 shows that the angle α (alpha) is an acute or sharp angle may be, i.e., and the angle β (beta) is a blunt or obtuse angle. The angle α (alpha) can be between 0 and 90 degrees with respect from the floor, for instance at an angle between 30 to 60 degrees, or about 50-55 degrees. The angle β (beta) can range from less than 180 degrees to about 120 degrees, or about 150-160 degrees. Both angles can be freely chosen within the given ranges, but with the additional requirement that a free end 47a of the cover 47 (at the second portion 47" of the cover) is either at the same height of a lower edge 48' of the outlet opening 48, or extends beyond the lower edge 48', while maintaining the passageway 49 between the tube 41 and the cover 47. A further requirement may be that the passageway 49 is releasing towards the outlet opening, i.e. the opening between the sidewall and the free end 47a of the cover (d1) is the smallest opening of the passageway 49, and the outlet opening 48 (d4) would be the largest opening of the passageway 49, wherein the opening between the free end 47a and the base 44 (d2) and the opening between the free end 47a and the lower edge 48' of the outlet opening 48 (d3) would have respective increasing dimensions, see also FIG. 3B. In other words, d1 is smaller than d2, d2 is smaller than d3, d3 is smaller than d4, such that d1 is the smallest opening in the passageway, and d4 is the largest opening in the passageway (d1<d2<d3<d4).

In FIG. 4, a projected second periphery of the tube 41, indicated by the dotted line 43a, extends beyond the first periphery 18 of the floor opening 14. FIG. 4 further shows an end flange 7 at the end edge of cover 47. The end flange 7 extends into the manure 21' that remains in the tube 41.

Figure 5:
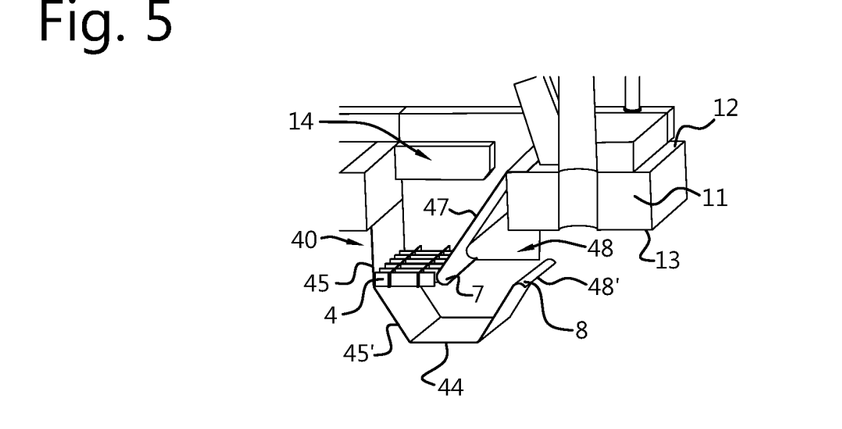
FIG. 5 shows a cross-section in perspective view of a fifth embodiment of the device.

FIG. 5 shows a grating 4 that is provided between the sidewall 45 and the cover 47. The grating extends over a part of the area of the floor opening 14, as the cover 47 decreases this area with its slanted direction. The grating 4 is provided such that strange objects, like a cattle collar or a stone, that end up in the collected or dumped manure will not enter the device 40 and/or the reservoir 20, but will be retained at the grating and can be removed without much ado. Furthermore, the grating 4 acts as a safety element, such that a person, like a child, and/or a small and/or young animal (a calf, a dog or a cat) are hindered to accidentally fall in the device 40 and/or reservoir 20. Moreover, the device 40 as shown in FIGS. 3 to 5 is also a safety means for the floor opening, as the cover 47 already reduces the area of the floor opening 14, and the base 44 of the tube 41 closes off the full access to the reservoir. It is preferred that the embodiments shown in FIGS. 3-5 are made of a rigid material, preferably a metal, such as stainless steel, or a plastic material.

The cover 47 and lower edge 48' of the outlet opening 48 are shown to have both an end flange 7, 8, respectively, see FIG. 5. The end flanges 7, 8 are shown rounded or curved, to enhance the flow of manure through the passageway 49.

Figure 6:
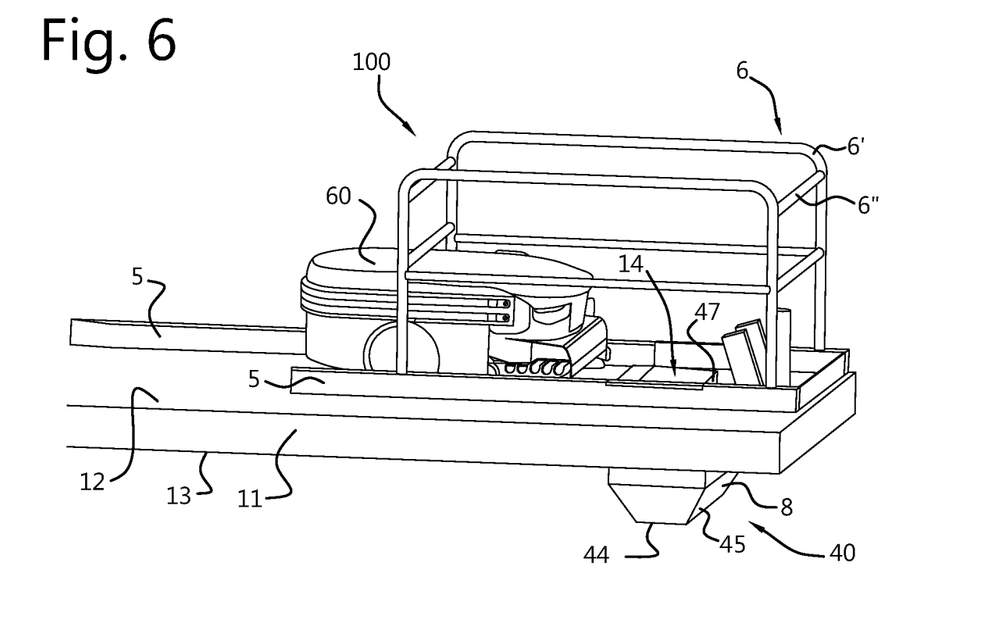
FIG. 6 shows a perspective view of part of an embodiment of the animal shed system.

FIG. 6 shows part of the animal shed system, now including a safety cage 6 that is provided to surround or envelope the floor opening 14. The safety cage 6 is a three-dimensional frame made of two side frames 6' that are interconnected with bars 6" extending between the two side frames 6'. The safety cage 6 is open to accommodate the manure suction robot 60 and allows access to the floor opening 14, as shown in FIG. 6. The manure suction robot 60 is guided towards the floor opening 14 with guide rails 5 on both sides of the floor opening 14. The guide rails 5 are here used as an integral part of the safety cage 6, but can be used as a separate part of the animal shed system 100, too. The safety cage 6 is used to further enhance the safety near the floor opening 14. As shown, the safety cage at least envelopes the area of the floor opening, and is attached to the animal shed floor.

Figure 7:
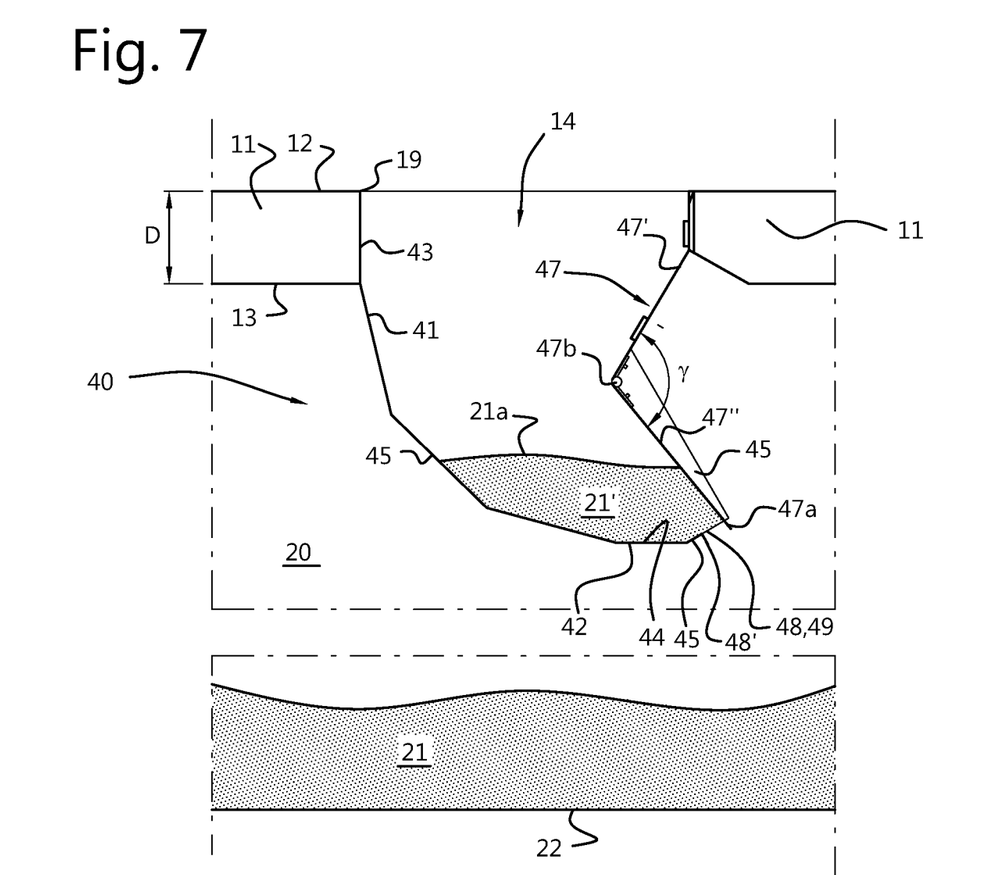
FIG. 7 shows a schematic view of a further embodiment of the device.

FIG. 7 shows another embodiment of the device 40 that is a variation to the embodiments shown in FIGS. 2 and 3. The first portion 47' and the second portion 47" of the cover 47 are now at an angle γ (gamma) such that the free end 47a of the cover at the second portion 47" now extends into the reservoir 20. The second portion 47" is hingeably connected to the first portion 47' through a hinge 47b.

When the level 21a of the manure 21' in the device 40 rises during use, the pressure on the second portion 47" increases. When the level 21a of manure 21' in the device 40 is at a sufficient height, the pressure is high enough to overcome the gravitation acting on the second portion 47". The manure 21' then pushes the second portion 47" into a rotational movement along the hinge 56. The outlet opening 48 is thus (further) opened and the manure 21' flows into the reservoir 20. As the level 21a of the manure 21' in the device 40 is lowered, the pressure against the second portion 47" is reduced, the second portion 47" moves in a downward rotation along the hinge 47b to close or at least decrease the outlet opening 48. A certain level 21a of manure 21' will remain in the device 40 to close off the remaining outlet opening 48 and as such prevent an airflow from the animal shed 10 to the reservoir 20 through the floor opening 14 by blocking the passageway 49 when in use.

Initially, the second portion 47" will rest on the lower edge 48' of the outlet opening 48, such that the outlet opening 48 is closed. In use, it is likely that some manure 21' will stick to the lower edge 48' and/or the second portion 47" such that the outlet opening 48 cannot be fully closed by the second portion 47", but will be closed by the remaining level 21a of manure 21' in the device 40.

| | LIST OF ITEMS |
|---|---|
| 4. | Grating or grid |
| 5. | Guiding rails |
| 6. | Safety cage |
| 7. | End flange of cover |
| 8. | End flange of lower edge |
| 9. | Airflow |
| 10. | Animal shed or space |
| 11. | Floor |
| 12. | First or living surface |
| 13. | Second surface |
| 14. | Floor opening |
| 15. | Flow hole |
| 16. | Feces |
| 17. | Urine |
| 18. | Periphery of the floor opening |
| 19. | Edge of the floor opening |
| 20. | Reservoir or manure cellar |
| 20'. | Urine storage space |
| 20". | Feces storage space |
| 21. | Manure in reservoir |
| 21'. | Manure in device |
| 22 | Bottom of reservoir |
| 23. | Separation wall |
| 30. | Extraction device |
| 31. | Blower |
| 40. | Device |
| 41. | Tube |
| 42. | Free end of the tube |
| 43. | Periphery of the tube |
| 44. | Base |
| 45. | Sidewall of the tube |
| 45'. | Converging portion of sidewall |
| 46. | Tensioning means or weight |
| 47. | Cover |
| 47a. | Free end |

-continued

| LIST OF ITEMS | |
|---|---|
| 47b. | Cover hinge |
| 47'. | First portion of cover |
| 47". | Second portion of cover |
| 48. | Outlet opening |
| 48'. | Lower edge of outlet opening |
| 49. | Passageway |
| 50. | Airwasher |
| 51. | Packed bed |
| 52. | Pump |
| 53. | Sprayer |
| 54. | Outlet |
| 55. | Absorption liquid |
| 60. | Manure suction robot |
| 100. | Animal shed system |
| 101. | Animal (cow) |

The invention claimed is:

1. An animal shed system comprising:
an animal shed having an animal shed floor with a first and a second surface spaced apart, such that the floor has a thickness different from zero, and multiple flow holes extending from the first to the second surface;
a reservoir situated under the animal shed floor, wherein the flow holes open up to the reservoir, and the flow holes allow a fluid flow, including a urine flow, from the animal shed to the reservoir, wherein feces stays on the first surface;
a floor opening in the animal shed floor to allow manure to be dumped in the reservoir;
a manure-removal vehicle for removing manure from the animal-shed floor and dumping the manure into the reservoir at the floor opening;
an air extraction device for extracting air underneath the floor, out of the reservoir; and
a device extending from the floor opening into the reservoir, wherein the device is configured to prevent an airflow from the animal shed to the reservoir through the floor opening when in use,
wherein the device comprises a tube extending from the floor at the floor opening, and towards a bottom of the reservoir,
wherein the tube has a free end ending at a distance different from zero from a bottom of the reservoir, the tube having a base that closes off the free end, and forms a container with a peripheral sidewall that encloses an interior of the device,
wherein the peripheral sidewall comprises an outlet opening towards the reservoir, the outlet opening being located at a distance from zero from the base,
wherein the device further comprises a cover extending into the tube and covering the outlet opening and part of the base,
wherein an end edge of the cover is at least at a same height as a lower edge of the outlet opening, the lower edge being at a distance different from zero from the base, thereby creating a passage from the floor opening to the outlet opening, and
wherein in use the airflow from the animal shed to the reservoir is prevented when a manure or feces level in the tube is at least at a similar height as the end edge of the cover or higher, thereby blocking the passageway for the airflow.

2. The system according to claim 1, wherein the air extraction device creates a lower pressure under the floor relative to the pressure above the floor.

3. The system according to claim 1, wherein the device further comprises a grating provided over at least part of a cross sectional area of the device.

4. The system according to claim 1, wherein the manure-removal vehicle is a wheeled manure-removal vehicle.

5. The system according to claim 1, further comprising a safety cage that at least envelopes the floor opening, and is attached to the animal shed floor.

6. The system according to claim 1, wherein the cover extends from the floor at the floor opening or from the peripheral sidewall of the tube at a location near the floor opening.

7. The system according to claim 1, wherein the cover covers the base fully along of one of a longitudinal direction and a transverse direction, and partly along another of the longitudinal direction and the transverse direction.

8. The system according to claim 1, wherein the peripheral sidewall has at least two outlet openings at separate locations of the peripheral sidewall at the same height, and the cover is funnel shaped, and extends into the tube covering all outlet openings in the peripheral sidewall.

9. The system according to claim 1, wherein the end edge of the cover extends beyond the lower edge of the outlet opening.

10. The system according to claim 1, wherein the outlet opening extends from the floor towards the base.

11. The system according to claim 1, further comprising an air washer coupled to the air extraction device to capture ammonia present in the extracted air.

12. The system according to claim 11, wherein the air extraction device creates a lower pressure under the floor relative to the pressure above the floor.

13. The system according to claim 11, wherein the device further comprises a grating provided over at least part of a cross sectional area of the device.

14. The system according to claim 1, wherein the device comprises a tube extending from the floor at the floor opening, and towards a bottom of the reservoir, wherein the tube has a free end ending at a distance different from zero from a bottom of the reservoir,
wherein the free end opens out into the reservoir, thereby forming a passageway from the animal shed floor to the reservoir, and
wherein in use an airflow from the animal shed to the reservoir is prevented when a manure or feces level in the reservoir extends up to or into the tube through the free end.

15. The system according to claim 14, wherein the tube has a peripheral shape of the floor opening or any other shaped cross-section.

16. The system according to claim 14, wherein a cross-sectional shape and dimensions of the tube coincide with a shape and dimensions of the floor opening.

17. The system according to claim 1, wherein the tube comprises an upper part and a lower part, and wherein at the lower part, the peripheral sidewall converges towards the base.

18. The system according to claim 17, wherein the lower edge of the outlet opening coincides with an upper edge of the lower part of the container.

19. An animal shed system comprising:
an animal shed having an animal shed floor with a first and a second surface spaced apart, such that the floor has a thickness different from zero, and multiple flow holes extending from the first to the second surface;
a reservoir situated under the animal shed floor, wherein the flow holes open up to the reservoir, and the flow holes allow a fluid flow, including a urine flow, from the animal shed to the reservoir, wherein feces stays on the first surface;

a floor opening in the animal shed floor to allow manure to be dumped in the reservoir;

a manure-removal vehicle for removing manure from the animal-shed floor and dumping the manure into the reservoir at the floor opening;

an air extraction device for extracting air underneath the floor, out of the reservoir; and a device extending from the floor opening into the reservoir, wherein the device is configured to prevent an airflow from the animal shed to the reservoir through the floor opening when in use, wherein the device comprises a tube extending from the floor at the floor opening, and towards a bottom of the reservoir, wherein the tube has a free end ending at a distance different from zero from the bottom of the reservoir, the tube having a base that closes off the free end, and forms a container with a peripheral sidewall that encloses an interior of the device, wherein the peripheral sidewall comprises an outlet opening towards the reservoir, wherein the outlet opening extends from the base towards the floor opening, wherein the device further comprises a cover extending into the tube and covering the outlet opening and part of the base, thereby creating a passage from the floor opening to the outlet opening, wherein the cover comprises a first portion and a second portion, wherein the second portion is hingeably attached to the first portion, wherein in use the second portion rests against the lower edge of the outlet opening and/or an amount of manure in the passageway, thereby blocking the passageway from the animal shed to the reservoir and preventing an airflow from the animal shed to the reservoir through the floor opening.

* * * * *